Feb. 9, 1960  A. A. LAWSON ET AL  2,924,199
PNEUMATIC SERVO MOTOR ASSEMBLY
Filed Feb. 7, 1956  5 Sheets-Sheet 2
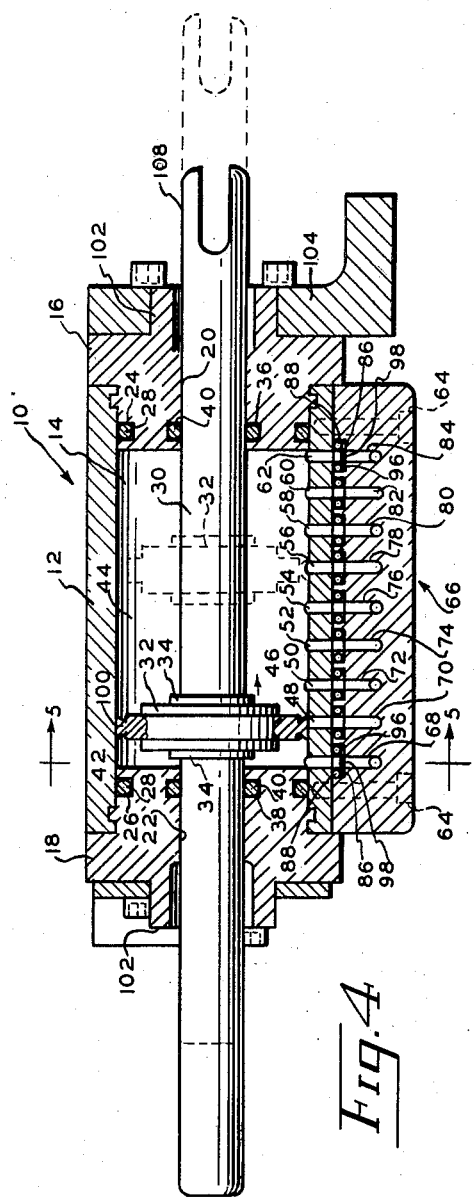
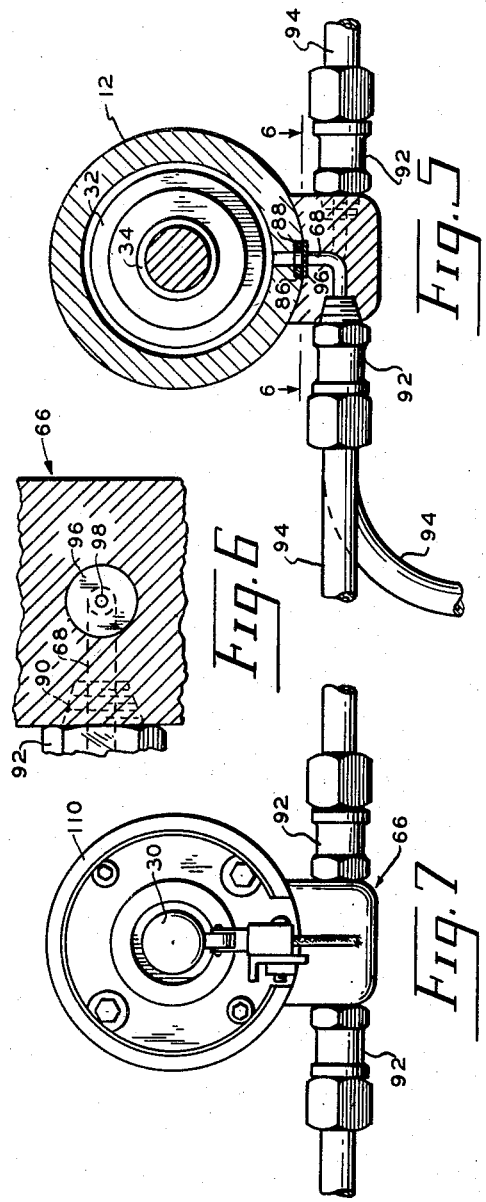
INVENTORS
AXEL A. LAWSON &
HERBERT K. HAZEL
BY *Hyman Hurwitz*
ATTORNEY

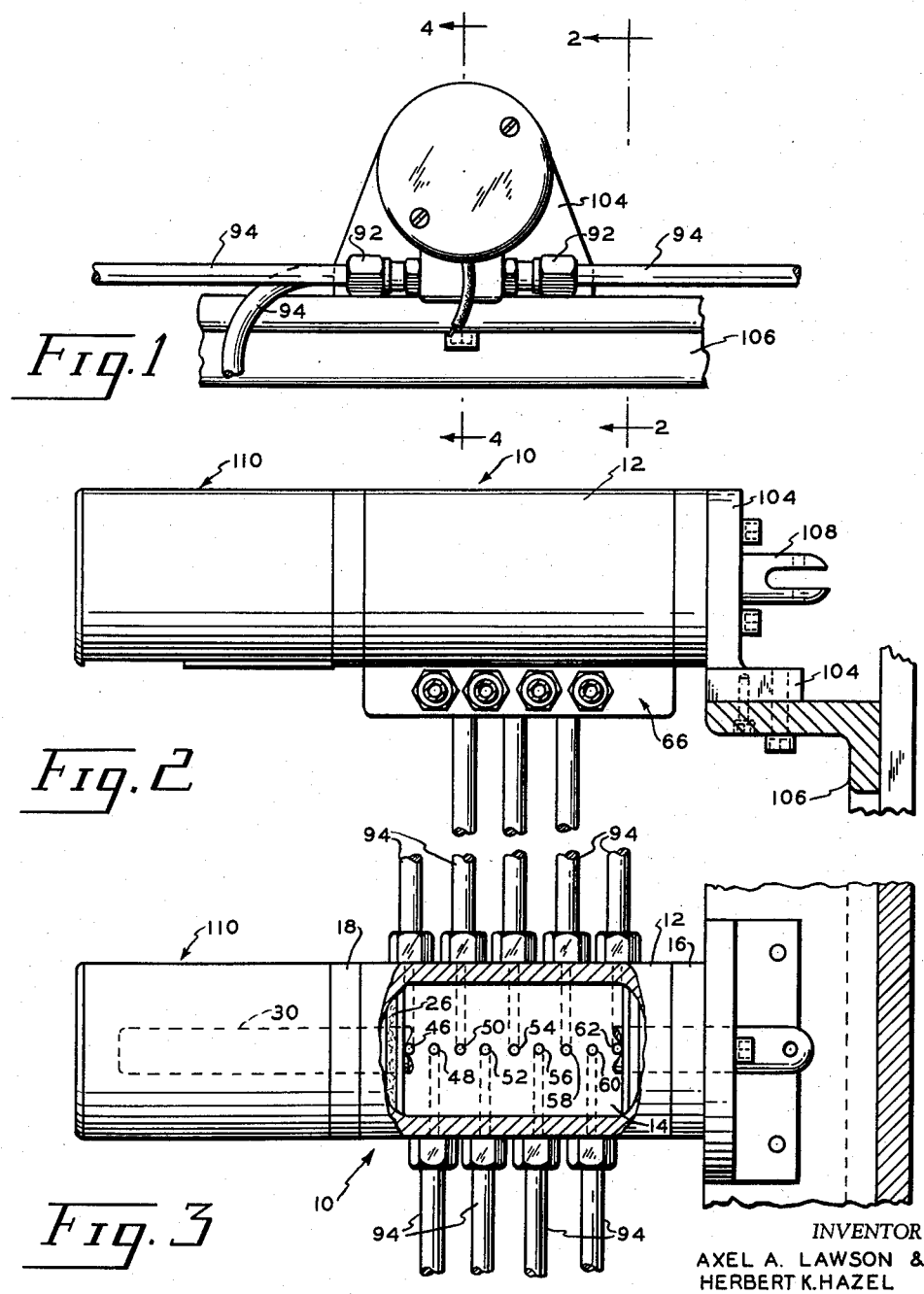
INVENTORS
AXEL A. LAWSON &
HERBERT K. HAZEL

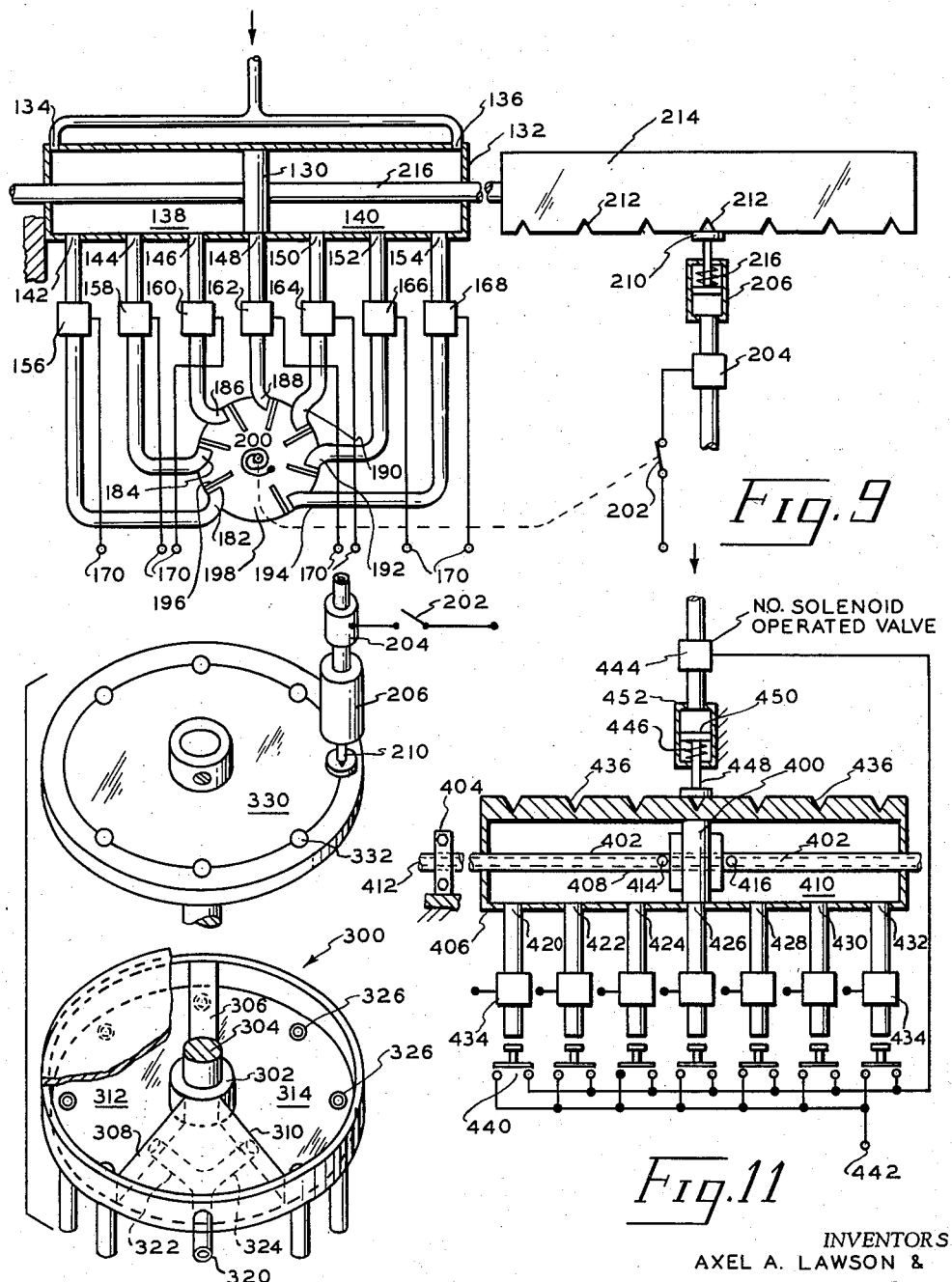

2,924,199
PNEUMATIC SERVO MOTOR ASSEMBLY
Axel Arnold Lawson and Herbert K. Hazel, Arlington, Va., assignors to Melpar, Inc., Falls Church, Va., a corporation of New York Application February 7, 1956, Serial No. 564,020

12 Claims. (Cl. 121—40)

The present invention relates generally to pneumatic servo-motors, and more particularly to rapid acting pneumatically actuated and electrically controlled servo systems, which provide the possibility of extremely precise positioning of a mechanical element at any selected one of a plurality of discrete positions.

It is known to provide liquid actuated servo-systems which are electrically controlled selectively to position a piston in any one of a plurality of discrete positions. The transition to pneumatic operation introduces serious problems of a practical nature, because of the compressibility of pneumatic fluids. The piston is readily capable of motion, by reason of such compressibility, in response to externally applied force, after being positioned, and for that reason is not sufficiently stable for many practical operations.

Further, in broad concept, pneumatic fluid is applied to opposite sides of a balanced piston, in pneumatic servos of the type here involved. A series of exhaust ports is provided in a cylinder in which the piston moves. Opening of an exhaust port unbalances the pressures on opposite sides of the piston, which thereupon moves so as to cover the opened exhaust port, and thereby to re-establish balanced pressures on the piston. The possible accuracy of positioning of the piston is, then, a function of the relative sizes of the exhaust ports and the piston width. The piston width must be greater than the diameter of the exhaust port in order to block the latter at all. But, insofar as it is greater than this minimum width, it may cover the port over a range of possible positions.

For the reasons stated pneumatic servos have not generally been considered satisfactory devices for accurate positioning, say to tolerances of .001" or less, for example.

It is a broad object of the present invention to provide a novel pneumatic servo system which enables accuracy of positioning to any desired mechanical tolerances.

In order to accomplish the recited objective, the servo piston is arranged to position a device having therein accurately located tapered apertures, positioned in accordance with desired final positions of the device. A pin is provided, which has a tapered end which may mate precisely with any selected one of the tapered apertures. The tapered apertures are located accurately to correspond with possible piston positions of a pneumatic servo, means are provided for normally locking the pin to one of the tapered apertures, to unlock same just before the piston is moved to a new position, and to maintain same while, and only while, the piston is moving to a new position.

Accordingly, pneumatic actuation of the piston provides a rough positioning operation, the piston arriving at approximately its final position. Locking of the pin and aperture provides a final accurate positioning, and moreover, the piston is locked in its final position and cannot be displaced in the slightest degree, even by large mechanical forces. Utilization of a tapered aperture and mating tapered pin-head provides a camming action of the pin-head against the internal wall of the aperture, which overcomes any frictional forces existing in the system. The piston itself is not subjected to any appreciable pneumatic forces, during this camming action, since it is in mechanically balanced relation so long as no exhaust port is open, or so long as any open port is blocked by the piston.

The present invention may be embodied in several forms. For example, relative motion of the piston and cylinder may be linear, and either the piston or the cylinder may be movable, the remaining element being stationary. In the alternative, relative motion of the piston and cylinder may be rotary, the piston taking the form of a vane which rotates on the axis of the cylinder, or which remains stationary as the cylinder rotates on its own axis.

It is, accordingly, an object of the present invention to provide a pneumatic motor, capable of effecting a positioning operation to rough tolerances, in combination with a camming device which corrects the positioning to fine tolerances, and prevents deviation of the final positioning.

It is another object of the present invention to provide a pneumatic servo-motor, in which the relative positions of a piston and cylinder are approximately determined by a pneumatic mechanism, and accurately determined by a co-acting mechanical lock.

A further and more specific object of the present invention is the provision of a vane rotating within a cylindrical chamber, and co-axially therewith, a wall of the vane subsisting in air-tight relation to the inner wall of the chamber, whereby the vane divides the chamber into two pneumatically isolated parts, equal pneumatic pressure being applied to both parts and a series of selectively openable exhaust ports being provided in the wall of the chamber, any one of which may be closed by the end wall of the vane when superposed thereon.

It is still another object of the present invention to provide a pneumatic servo-system which utilizes an optimum ratio of input to output port dimensions, the term optimum implying that maximum unbalanced pneumatic force is generated for a minimum ratio of output to input port areas, and that this force is suited to the mechanical inertia of the system.

It is still a further object of the present invention to provide a pneumatic servo-motor in which precise balance of forces on opposite sides of a pneumatically operated piston is accomplished, by employing equal piston areas, whereby the supply of air to the opposite sides of the piston does not require metering, but may be of any desired pressure, so long as derived from the same source.

The problem of cycling, or timing, the operation of pneumatic servo-systems arranged in accordance with the present invention involves the timing of the pneumatic operation with respect to the locking operation. Initially, the piston is locked. Before a pneumatic positioning operation can take place, it is necessary to perform an unlocking operation, and the latter must occur before the pneumatic positioning begins, by an extremely short interval of time. The actuation of the locking device, into locking relation, must then occur immediately after pneumatic positioning has been completed. Yet the time required for completion of a pneumatic positioning operation is variable, depending on the total required stroke, the magnitude of the opposing forces, and the magnitude of the pneumatic pressure available. In accordance with the present invention, sensing of pneumatic fluid is utilized as a control. A device is provided for sensing exhausting fluid at any exhaust port. The locking device employed may be normally pneumatically urged into engaged position, and spring biased out of engaged position. During and in response to the exhaust process, the pneumatic pressure on the locking device is cut-off, so that the locking device is unlocked in response to the bias spring. As soon as the exhaust process is terminated, by virtue of the pneumatic piston having found and covered the open port, the pneumatic pressure on the locking device is re-established, and the locking device re-locked. Whenever a port is opened, and in response to such opening, the locking device is unlocked. When all ports are closed, and in response to the state of closure, the locking device locks.

It has been found that the size of the exhaust ports must be suitably related to the size of the input ports, for optimum operation. The recommended ratio of areas is of the order of 4:1, although in arriving at an optimum ratio the pneumatic pressures and pressure losses must be considered. The recited ratio is empirically arrived at. The reason that an optimum ratio exists may be explained as follows. If the exhaust and input ports are of equal sizes, opening of an exhaust port will not sufficiently reduce pressure in the associated chamber, because gas is resupplied to the chamber as fast as it is exhausted. As the exhaust port is increased in area, relative to the input port, the exhaust process becomes more rapid than the process of pressure replenishment. However, the process of increasing the ratio of areas of output port to input port can with profit be carried only to a certain point, in any given system, because of the mechanical inertia of the system. The optimum ratio is usually found to be of the order of 4:1.

It is, accordingly, an object of the present invention to provide a pneumatically controlled servo-motor in which a control operation is required to follow immediately on completion of motion of a pneumatic operation, the control operation occurring in response to suitable pressure variations in the pneumatic system.

It is another object of the invention, in a pneumatic system employing two pneumatic chambers having exhaust ports, the chambers being normally under equal pressures, and in which a movable partition between the chambers is caused to move so as to close an exhaust port in either chamber, when the exhaust port is opened, to utilize a ratio of exhaust to input port areas of the order of 4:1.

The above and still further features, objects and advantages of the present invention will become apparent upon consideration of the following detailed disclosure of certain specific embodiments of the invention, especially when taken in conjunction with the accompanying drawings, wherein:

Figure 1 is a view in rear elevation of a servo-motor in accordance with the present invention;

Figure 2 is a view in side elevation of the servo-motor, as seen substantially from line 2—2 of Figure 1;

Figure 3 is a top plan view of the servo-motor, with parts broken away and in section, for clarity;

Figure 4 is an enlarged view in vertical section, taken substantially on the line 4—4 of Figure 1, and showing in dotted lines the alternate positions of certain elements of the system;

Figure 5 is a sectional view taken substantially on the line 5—5 of Figure 4;

Figure 6 is an enlarged fragmentary sectional view taken substantially on the line 6—6 of Figure 5;

Figure 7 is an elevational view looking from left to right in Figure 4, with a cover plate removed.

Figures 9–12, inclusive, illustrate schematically four specific embodiments of complete systems in accordance with the present invention.

Figure 8:
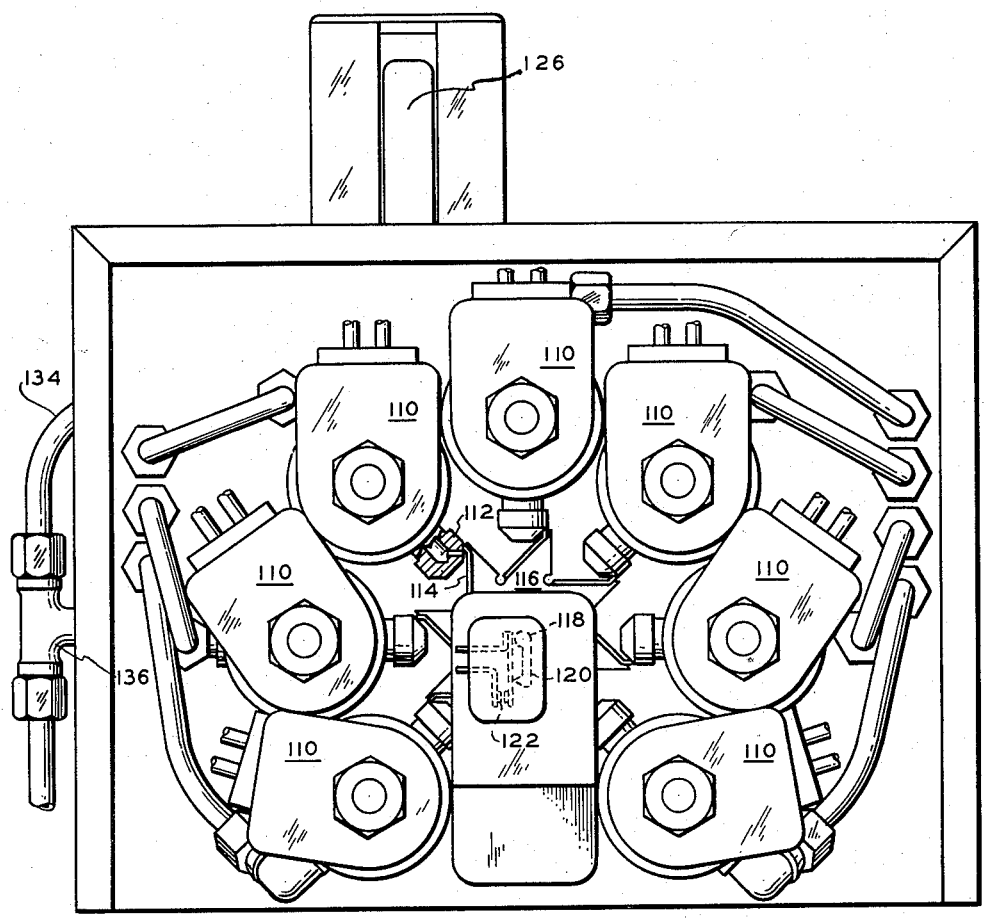
Figure 8 is a view in plan of a vane operated switch responsive to exhaust gas from any one of a plurality of exhaust ports.

Referring now more particularly to Figures 1–7 of the accompanying drawings, a servo-motor in accordance with the invention is indicated generally at 10, and includes a tubular cylinder having an internal bore 14, said cylinder having suitably secured at opposite ends a pair of end caps 16 and 18, which include transverse aligned circular apertures 20 and 22, respectively. The cap elements 16 and 18 include annular grooves 24 and 26, respectively, extending around the outer periphery of portions of the cap elements which are received within the bore 14, said grooves receiving therein suitable sealing elements 28, such as O-rings. Reciprocably received within the circular apertures 20 and 22 is a piston rod 30, which has suitably secured on an intermediate portion thereof a piston 32, said piston having equal areas on opposite sides thereof, and being retained on the piston rod 30 by means of suitable lock rings 34, disposed on opposite sides of said piston. The piston may be constructed of any suitable material, Teflon being one of the materials suitable for this purpose. The apertures 20 and 22 have annular grooves 36 and 38, respectively, extending around the inner peripheries thereof, for receiving suitable seal elements 40, such as O-rings, for sealing the piston rod 30.

The piston 32, which is reciprocable in the bore 14 of the cylinder 12 of the servo-motor, defines a partition for a pair of pneumatic chambers 42 and 44. Because the piston 32 has uniform areas on its opposite walls, and the diameter of the piston rod 30 is the same in both chambers, pneumatic forces on opposite sides of the piston may be precisely equal if pneumatic pressure is applied to the separate chambers from a common source, at least under static conditions.

Extending laterally through the cylinder 12, in communication with the interior thereof, is a plurality of longitudinally spaced ports 46–62, inclusive, which constitute control ports for controlling the position of the piston 32 within the bore 14. Secured to the cylinder 12 by means of suitable machine screws, 64, for example, is a manifold 66, which includes pneumatic channels 68–84, inclusive, secured in communication with the respective ports 46–62, respectively, said manifold 66 having an upper concave surface conforming to that of the outer periphery of the cylinder 12. Each of the pneumatic channels 68–84, inclusive, includes a substantially enlarged annular recess 86, in which is disposed a suitable sealing element, 88 (for example, an O-ring) for providing a sealed relationship between the respective ports 46–62 and the channels 68–84.

The channels 68–84 extend to suitable nipple elements 92, which communicate with pneumatic conduits 94.

Disposed in the recess associated with ports 46 and 62 are washer-like elements 96, which include transverse central metering orifices 98. Normally in communication with the channels 68 and 84 is a source of pneumatic fluid under pressure (not shown) providing equal pneumatic pressures in chambers 42 and 44, via input ports 46 and 62.

The end cap elements 16 may include a hub 102, for accommodating a suitably apertured support bracket 104, which may be in turn secured on a support element 106 of any suitable character. The piston rod 30 includes a bifurcated end portion 108, to which may be secured dies or jigs, for example, which may be moved in an assembly or forming process by desired increments of distance, as determined by the spacings of the exhaust ports 48–60, inclusive.

The relative areas of the metering orifices 98, and of the exhaust ports 48–60, inclusive, are of the order of 1:4, for reasons which will appear as the description proceeds.

Assuming now that all the exhaust ports 48–60, inclusive, are closed, and that the input ports 46 and 62 are open, equal total pressures will appear on the opposite sides of the piston 32, and the latter will remain stationary. Assume that one of the exhaust ports, say 56, is opened. The pneumatic pressure in the chamber 44 will then be rapidly reduced, and this is true despite the fact that pneumatic fluid is continuously being replenished via input port 62, because the exhaust port is relatively large, and the input port is reduced in size, effectively, by the metering orifice 98. It has been found empirically that relative areas of approximately 1:4 is optimum, in the sense that a greater ratio leads to no appreciable increase in speed of operation of the system, which is limited by the inertia of its several elements. An appreciably smaller ratio, on the other hand, results in a reduction of speed of operation. It is desirable that minimum exhaust port sizes be employed, for convenience of fabrication, and to minimize piston thickness, and hence inertia.

Pressure in the chamber 42, which is not being exhausted, remains high whether or not a port in chamber 44 is open. If, then, the port 56 is open, a differential of pressure exists in the chambers 42, 44, which drives the piston 32 toward the open port. The width of the piston 32, at 100, is adequate to cover any one port, and when the piston 32 has moved into superposition of port 56, closing off the port, pressure again builds up in chamber 44, until equal pressures exist on the opposing walls of piston 32, and the piston terminates its motion.

It will be clear that the width of the piston 32 must exceed the diameter of the exhaust ports. For this reason, uncertainty of final position of piston 32 exists, since a range of piston positions exists for which a port will be covered by the piston. For many applications of pneumatic servos, extreme accuracy of final positioning is desired. Moreover, fixity of final piston position may also be required, and in a pneumatic servo, when equal pneumatic pressures exist on both sides of a positionable piston, motion of the piston is not opposed except by the compressive force of the pneumatic fluids.

We have, accordingly, provided means for locking the piston as soon as the piston has attained its final position. In order that the locking means shall become ineffective whenever the servo-motor is required to change its position, and to become effective again immediately a positioning operation has terminated, the locking device is made responsive to exhaust gases from any one of the exhaust ports of servo-motors arranged in accordance with the present invention.

Referring more particularly to Figure 8 of the accompanying drawings, the reference numerals 110 represent solenoid actuated exhaust valves, which may control the exhaust of pneumatic fluid from the several exhaust ports 48–60, inclusive. Each of the exhaust valves 110 leads to a nozzle, as 112, capable of directing exhaust pneumatic fluid against one of the vanes 114 of a pneumatic turbine 116. The shaft 118 of the latter actuates an arm 120, which in turn closes a normally open microswitch 122. The latter is spring biassed to open position, and serves therefore to spring bias the pneumatic turbine 116 to unactuated position. In the alternative, a separate bias spring may be supplied for the turbine 116.

In Figure 9 of the accompanying drawings is illustrated, in simplified form, a complete servo-motor system according to the invention. A piston 130 moves within a cylinder 132. Pneumatic fluid under pressure is supplied to the extreme ends of the cylinder, via input ports 134, 136, from a common source. The piston 130 divides the cylinder 132 into two chambers, 138, 140. The areas of the piston 130, taken on each wall thereof, are arranged to be equal. Since the pressures in the cylinders 138, 140 are equal and the areas of the cylinders are also equal, the total pressures applied to each side of the piston 130 are equal, and the piston 130 is in balance mechanically, and remains stationary.

A plurality of exhaust ports 142, 144, 146, 148, 150, 152, 154 is provided in the walls of the cylinder 132, the size of any of which is such that it may be closed completely by the piston 130, when the latter is superposed over the port. The several ports 142–154 are normally closed, by solenoid actuated pneumatic valves 156–168 respectively. However, on energization of any one of solenoid actuated pneumatic valves 156–168, inclusive, by electrical signal applied to an appropriate one of leads 170, the corresponding exhaust port is placed in correspondence with the atmosphere, via one of exhaust conduits 182–194, inclusive. The latter are positioned, at the ends open to the atmosphere, so as to actuate the blades 196 of a pneumatic turbine 198, normally spring biassed to an unactuated position by helical or spiral spring 200. The turbine 198 actuates a switch 202, normally closed, into open position, by any suitable linkage. When closed the switch 200 energizes a solenoid operated pneumatic valve 204, maintaining the latter open. The valve 204 supplies pneumatic fluid under pressure to a pneumatic motor 206, which serves to press a tapered pin 210 within a mating tapered recess 212 in a bar 214. The bar 214 is rigidly coupled with, or forms a continuation of the piston rod 216. The several tapered recesses, as 212, are so located that pin 210 mates with one or another of these, in accordance with the position of piston 130. The pin 210 is spring biassed to unactuated position by a spring 216 in motor 206.

In operation, any selected one of leads 170 may be supplied with an electrical signal, energizing and opening the corresponding solenoid actuated valve 156–168. Opening the valve bring the corresponding one of ports 142–154 into communication with the atmosphere. Air exhausts from that one of chambers 138, 140 which contains the open exhaust port, resulting in an unbalance of forces on opposite walls of piston 130. The latter moves to cover the open port.

Exhaust of pneumatic fluid via the open one of ports 142–154 serves to apply exhaust fluid to the pneumatic turbine 198, rotating the latter, and opening switch 202. When the latter is opened pneumatic pressure is cut-off from motor 206, and pin 210 is retracted by the spring 216.

The pin 210 is retracted as soon as exhaust air becomes available from the selected one of exhaust ports 142–154. This occurs before the piston 130 can move, represents a positive signal that piston 130 is about to move. When the piston 130 has completed its movement, and covered the open port, and then only, will the turbine 198 return to unactuated position, reclosing switch 202, and again engaging the tapered pin 210 with one of tapered recesses 212.

The locking and unlocking operation is thus positively geared, to the piston motion, regardless of when the latter occurs or of how long it may endure. The total time required for the piston to complete a movement depends, among other things, on the load on the servo-motor, on the total travel required, on the pneumatic pressures available, and on the relative sizes of exhaust and input ports. The latter factor has been fully explained hereinabove.

A system broadly similar to that of Figure 9 may be provided, in which rotary motion of a servo-motor shaft is available, rather than translatory motion. Such a system is illustrated in Figure 10 of the accompanying drawings, wherein the reference numeral 300 denotes a hollow cylinder, having a central boss 302, through which extends a shaft 304. Secured to the shaft 304, and extending between the inner periphery of the cylinder 300 and the boss 302 is a movable vane 306, which rotates with the shaft 304. A pair of similar stationary vanes 308, 310 is also provided. The vane 308, with the vane 306, defines a chamber 312. The vane 310, with the vane 306, defines a further chamber 314. The vane 306 provides a partition separating the chambers, and is provided with walls of equal area in the several chambers.

Pneumatic fluid under pressure from a common source 320 is applied to both chambers 314, 316 via conduits 322, 324. A plurality of exhaust ports 326 is provided in a wall of the cylinder 300, at various angular positions, with respect to shaft 304. The exhaust ports 326 may be controlled by means of solenoid actuated valves, as in Figure 9, and may in turn control a pneumatic turbine, as in Figure 9, to control locking motor 206, which locks a disc 330, mounted on shaft 304. To this end the disc 330 is provided with tapered recesses 332, aligned with ports 326, capable of being locked by tapered pin 210.

While the more usual arrangement of servo-motors in accordance with the present invention contemplates a stationary cylinder, and a movable piston, certain advantages accrue to the use of a stationary piston and a movable cylinder. Referring now more particularly to Figure 11 of the accompanying drawings, there is illustrated a stationary piston 400 secured to a stationary piston rod 402, supported in a suitable bracket 404. The piston 400 is located within a closed cylinder 405, which is movable on the piston 400. The latter divides the cylinder 406 into two chambers 408, 410, to which pneumatic fluid at the same pressure is supplied via a conduit 412 extending internally of piston rod 402 to a pair of input ports 414, 416 located, respectively, in the chambers 408, 410, adjacent to and on opposite sides of the piston 400. The end walls of the cylinder 406 have equal areas, and being exposed to equal pneumatic pressures are subjected to balanced opposing forces. The cylinder 406, under these conditions, remains stationary.

A plurality of exhaust ports 420, 422, 424, 426, 428, 430, 432 is provided in the wall of cylinder 406, at different axial positions therealong. These ports are controlled selectively by means of solenoid operated valves 434, which are normally closed, and which open when electrically energized.

Upon opening a selected one of ports 420–432, by energizing a corresponding one of valves 434, the pneumatic fluid in one of the chambers 408, 410, only, is exhausted. Exhaust at a rapid rate is assured by providing an exhaust port of greater transverse dimension than the input ports, by a factor of about 4:1. The cylinder 406 is, when one chamber is at least partially exhausted, subjected to unbalance of forces, and moves to enable the piston 400 to cover the open port.

Provided in an external wall of the cylinder 406 is a plurality of tapered recesses 436, preferably in alignment with the ports 420–432, respectively, although this is not essential, provided the spacings between recesses 436 are equal to those between ports 420–432. In fact, the recesses 436 may, if desired, be placed on a structure mechanically distinct from, but coupled with, the cylinder 436. In such case, gearing or linkage may exist between the cylinder and the distinct structure, which may amplify or reduce motions. The spacings of the recesses may be compensated for such reduction or amplification, in an obvious way.

The exhaust ports 420–432 each leads to the atmosphere adjacent to a normally open microswitch 440, for operation by exhaust fluid. Contacts of several switches 440 are connected in parallel to a common source of power 442, and to a solenoid actuated pneumatic valve 444, normally open, so that closure of any one of switches 440, in response to exhaust fluid pressure thereagainst, energizes the solenoid, and closes the valve. When the valve closes, a spring 446 withdraws a tapered-end pin 448 from engagement with one of the mating tapered recesses 436. While the valve is open, pneumatic pressure on the piston 450 of a pneumatic motor 452 retains the tapered-end pin 448 in mating engagement with the underlying recess 436.

Accordingly, the cylinder 406 is released for motion concurrently with opening of any one of ports 420–432, and is locked in final position, by pin 448, when it has attained its final position, such that the piston 400 covers and closes the open port.

The device adopted in the embodiment of my invention illustrated in Figure 9, for locking the system, is applicable to the system of Figure 11, and vice versa.

Figure 12:
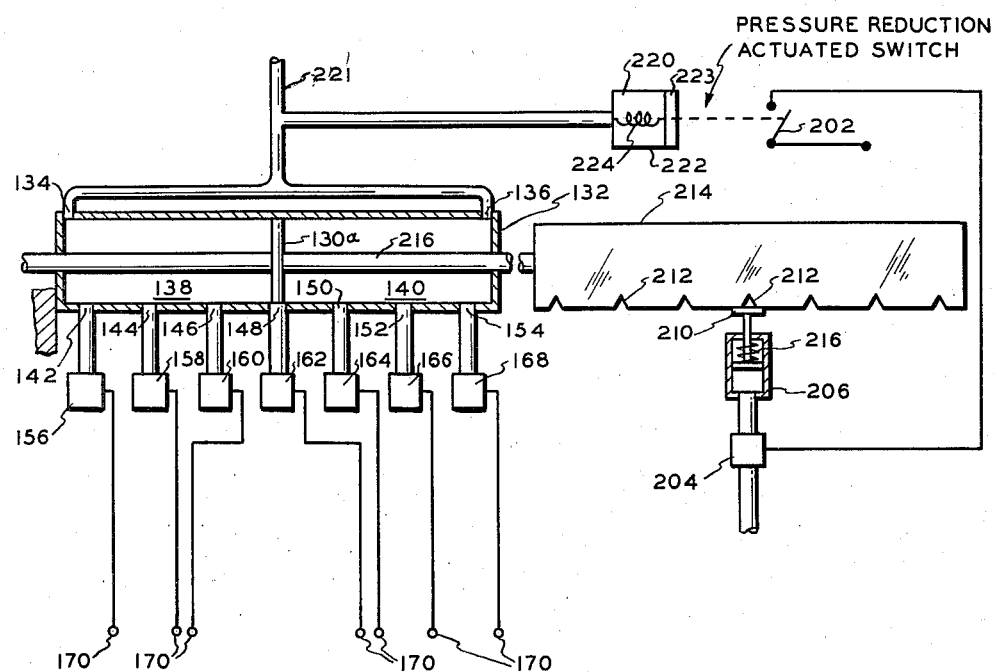

Referring now to Figure 12 of the accompanying drawings, there is illustrated a modification of the system of Figure 9 wherein the switch 202 which controls the valve 204 of locking motor 206 is actuated in response to a pneumatic device 220 which senses reduction in pressure in pneumatic input line 221. Such a device may consist of a pneumatic cylinder 222 having therein a spring biased piston 223. Normal pressure in line 221 maintains the piston 223 in one extreme position, against the bias of tension spring 224. When exhaust takes place from any of exhaust ports 142–154 pneumatic pressure in line 221 drops sufficiently to enable the spring 224 to pull the piston 223 to its alternative position, closing switch 202, and unlocking the locking bar 214 by releasing pressure from motor 206. When the open port is covered substantially, by piston 130a, pressure again builds up in line 221, and the switch 202 opens, again locking the locking bar 214.

The motor 222 of Figure 12 may be replaced by a Bourdon tube, or any other known device which is mechanically actuatable from one position to another in response to a variation of pressure.

The piston 130a, in distinction to the piston 130 (Figure 9) is very slightly too small to cover any of the ports 142–154, regardless of piston position. The piston 130a therefore assumes a position symmetrical with respect to any port and pneumatic fluid, usually air, leaks past both sides of the piston continuously. It would appear that the arrangement of Figure 12 is inefficient, relative to the arrangement of Figure 9, since it is never air tight. However, one of the problems which arises in designing pneumatic servo-systems is that of preventing oscillations, characterized by multiple overshoot of the piston with respect to a port. It has been found empirically that such oscillations are reduced in number and amplitude, in the arrangement of Figure 12, with respect to oscillations which occur in systems such as are illustrated in Figure 9. Moreover, the total leakage of air can be arranged to be very slight, by proper dimensioning of the ports and piston.

While we have described and illustrated one specific example of the present invention it will be clear that variations of the specific details of construction may be resorted to without departing from the true spirit of the invention as defined in the appended claims.

What is claimed as new is as follows:

1. A pneumatic servo-motor comprising a first pneumatic chamber, a second pneumatic chamber, a partition between said chambers and forming a boundary therebetween, said partition and chambers being relatively movable, means for supplying pneumatic fluid at equal pressure to said first and second pneumatic chambers, a plurality of means for exhausting pneumatic fluid from each of said chambers, said partition including means for actuating said means for exhausting selectively in accordance with its position relative to said chambers, the walls of said partition in each of said first and second chambers being of equal areas, said means for exhausting pneumatic fluid adopted and arranged to exhaust said pneumatic fluid at the order of four times the rate of supply by said means for supplying pneumatic fluid.

2. A pneumatic servo-motor comprising a first pneumatic chamber, a second pneumatic chamber, a partition between said chambers, said partition providing a boundary between said chambers, opposite walls of said partition forming wall portions of said chambers respectively, and being of equal areas, said partition and chambers being relatively movable, means for supplying pneumatic fluid at equal pressures to both said chambers at a predetermined rate, means for exhausting said pneumatic fluid from said chambers at a substantially higher rate by a factor of at least two, said last means including a plurality of exhaust ports, said partition arranged to seal said exhaust ports selectively in accordance with positions of said partition with respect to said chambers, means for normally locking said partition relative to said chambers during sealing of all said exhaust ports and means for unlocking said partition relative to said chambers in response to exhaust of pneumatic fluid via any of said exhaust ports.

3. The combination in accordance with claim 2 wherein said means for normally locking includes a tapered pin and a mating tapered receptor therefor, and means normally locking said pin and receptor in mating relation, and means responsive to exhaust of pneumatic fluid via any of said exhaust ports for relatively moving said pin and receptor into unmated relation.

4. A pneumatic servo-motor comprising a first pneumatic chamber, a second pneumatic chamber, said chambers together providing substantially a circular cylinder, a partition between said chambers, said partition providing a boundary between said chambers, opposite walls of said partition forming wall portions of said chambers, respectively, and being of equal areas, said partition and chambers being relatively movable about an axis of said cylinder, means for supplying pneumatic fluid to said chambers at equal pressures to both chambers at a predetermined rate, means for exhausting said pneumatic fluid from said chambers at a substantially higher rate by a factor of substantially 4:1, said last means including a plurality of selectively operable exhaust ports, said partition arranged to seal said exhaust ports one at a time and selectively in accordance with the relative positions of said partition and said chambers.

5. The combination in accordance with claim 4 wherein is further provided means for normally locking said partition relative to said chambers, and means responsive to pressure of exhaust pneumatic fluid in any of said exhaust ports for relatively unlocking said partition and chambers for the duration of said last named pressure.

6. In combination, a piston, a closed cylinder, said piston reciprocable in said cylinder, whereby said piston defines two chambers, the relative volumes of said chambers being a function of position of said piston, pneumatic means for positioning said piston approximately at a predetermined location within said cylinder, cam means for positioning said piston accurately at said predetermined position within said cylinder, and means responsive to completion of operation of said means for positioning said piston approximately within said cylinder for actuating said cam means for positioning said piston accurately within said cylinder.

7. The combination in accordance with claim 6 wherein is further provided means for retaining said cam means actuated in response to retention of said piston at said first mentioned predetermined position.

8. The combination in accordance with claim 6 wherein is provided a plurality of exhaust ports communicating with said chambers and substantially coverable selectively by said piston, an input pneumatic line supplying pneumatic fluid at equal pressures to said chambers, and wherein said last means includes a pressure decrease responsive device arranged to sense a predetermined decrease of pneumatic pressure on said input pneumatic line, and means for actuating said cam means in response to said predetermined decrease of pneumatic pressure.

9. The combination in accordance with claim 8 wherein said piston has a thickness inadequate completely to cover any of said exhaust ports.

10. A pneumatic servo motor comprising a first pneumatic chamber, a second pneumatic chamber, a partition between said chambers, said partition providing a boundary between said chambers, opposite walls of said partition forming wall portions of said chambers, respectively, and being of equal areas, said partition and chambers being relatively movable, whereby the volumes of said chambers are variable in relatively inverse sense, means for supplying pneumatic fluid at equal pressures to both said chambers via apertures of a predetermined cross-sectional area, means for exhausting said pneumatic fluid from said chambers via apertures of cross-sectional area equal approximately four times the cross-sectional area of said first-mentioned apertures, said last means including a plurality of exhaust ports selectively operable only one at a time, said partition arranged to seal said exhaust ports at least substantially, and selectively and only one at a time in accordance with positions of said partition with respect to said chambers, means normally locking said partition against motion relative to said chambers while all said exhaust ports are closed, means for selectively opening one of said exhaust ports, whereby to generate a change of pressure of fluid in said means for supplying pneumatic fluid and in said open exhaust port, means for sensing one of said last-mentioned changes of pressure, and means responsive to said means for sensing for unlocking said means for normally locking said partition relative to said chambers.

11. The combination according to claim 10, wherein said means for supplying pneumatic fluid is a fluid conducting conduit, wherein said means for sensing a predetermined change of pressure is a pressure responsive switch mechanism, wherein said means for normally locking said partition and said means for unlocking said partition comprises a mechanical member secured to said partition, said mechanical element comprising a plurality of first camming elements, a second camming element arranged to mate with any one only of said first camming elements, said second camming element comprising spring biasing means normally urging said second camming means into mating position with respect to said first camming means, and means responsive to actuation of said switching mechanism for actuating said second camming means out of mating relation to said first camming means.

12. A pneumatic servo-motor comprising a cylinder including an internal bore, apertured cap elements for said bore, a piston reciprocably supported in the bore and defining opposed variable volume chambers in the bore, a piston rod extending through a central apertured portion of the piston element and including opposite end portions reciprocably supported in the apertured end cap elements, said piston element and piston rod defining symmetrical end portions extending into one side of each variable volume chamber to provide a substantially pressure balanced piston and rod assembly, a fluid pressure inlet port in communication with each of the variable volume chambers to provide fluid of equal pressures on opposite sides of the piston, and a plurality of normally closed fluid exhaust ports disposed between the inlet port portions along the bore of the cylinder, whereby opening of any given single exhaust port results in a pressure differential in the variable volume chambers and a predetermined increment of relative movement between the piston and the cylinder member until the piston overlies the exhaust port which has been opened and the pressure differential is equalized, said exhaust ports having each substantially the same maximum length in a direction longitudinally of said bore, said piston having a thickness in a direction longitudinally of said bore which is negligibly greater than said length of said exhaust ports, wherein the inlet fluid pressure ports include a metered orifice portion of a smaller cross sectional area than the cross sectional area of any single exhaust port by a factor substantially 4:1.

References Cited in the file of this patent

UNITED STATES PATENTS

| | | |
|---|---|---|
| 1,004,541 | Martin | Sept. 26, 1911 |
| 1,085,964 | Briggs | Feb. 3, 1914 |
| 1,484,030 | Kitchen | Feb. 19, 1924 |
| 2,171,005 | McNeil et al. | Aug. 29, 1939 |
| 2,219,965 | Smitt | Oct. 29, 1940 |
| 2,398,997 | Berry et al. | Apr. 23, 1946 |
| 2,703,149 | Nelson | Mar. 1, 1955 |